Figure 5:
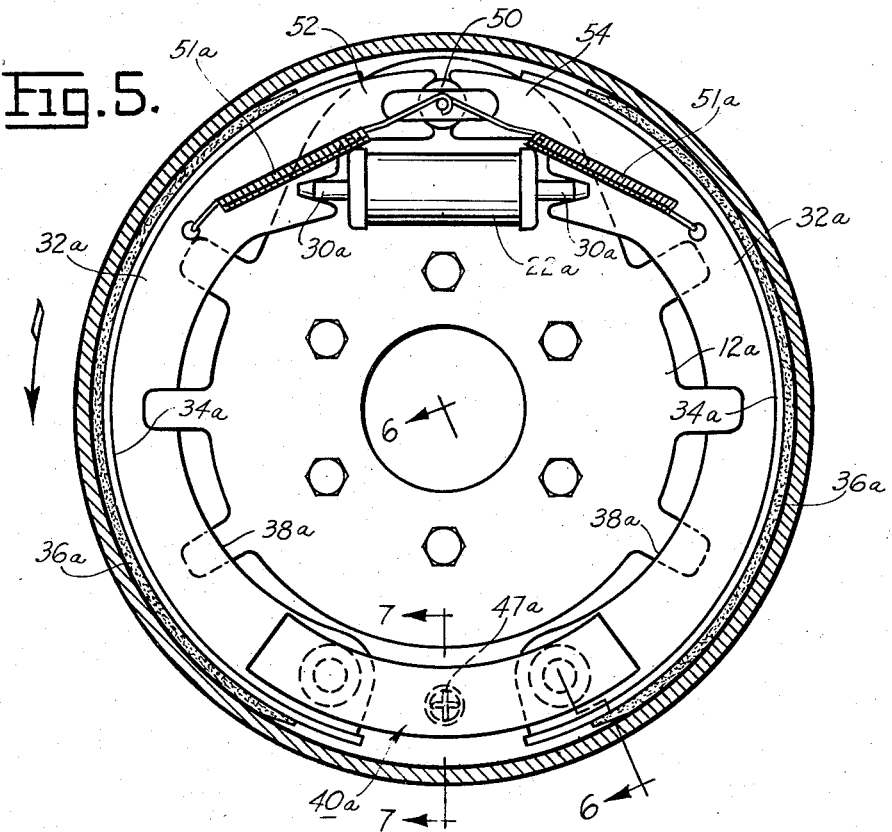

Jan. 17, 1961    R. T. BURNETT    2,968,367
COMBINATION SHOE AND DISK BRAKE
Filed June 17, 1955    3 Sheets-Sheet 1
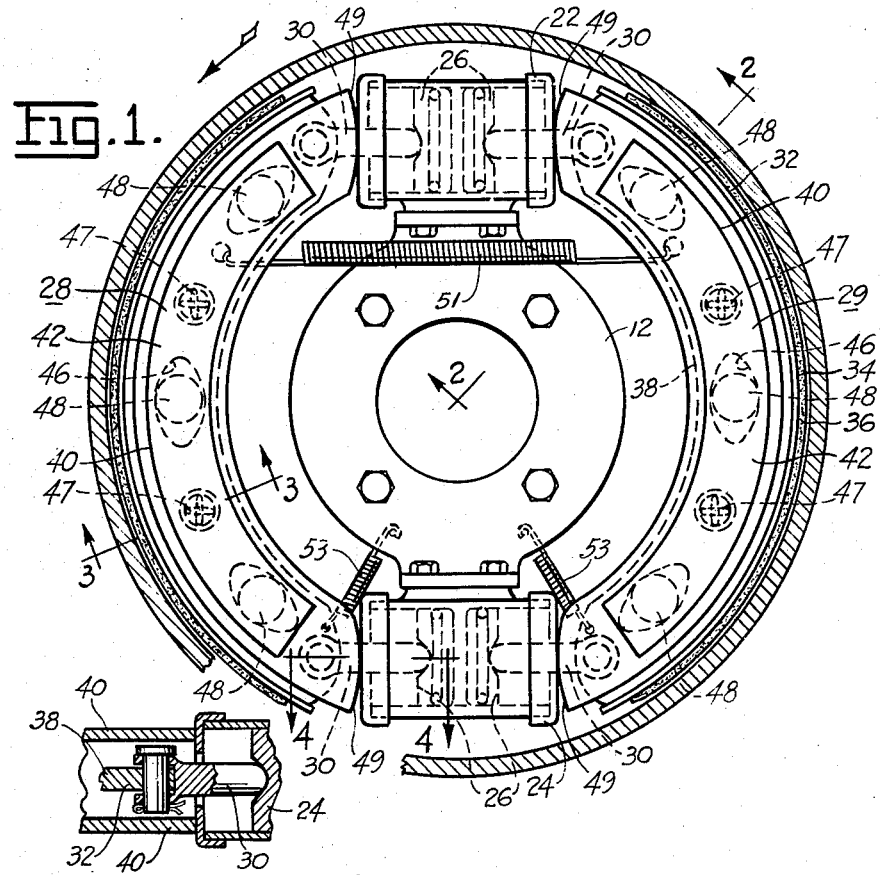
Fig.1.
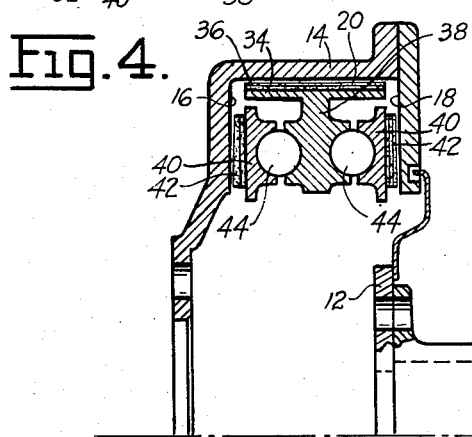
Fig.4.
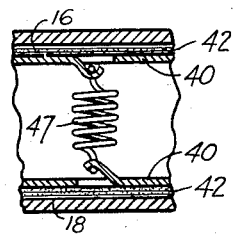
Fig.3.
Fig.2.
INVENTOR.
RICHARD T. BURNETT.
BY John A. Young
ATTORNEY Jan. 17, 1961 R. T. BURNETT 2,968,367
COMBINATION SHOE AND DISK BRAKE
Filed June 17, 1955 3 Sheets-Sheet 2

INVENTOR.
RICHARD T. BURNETT.
BY John A. Young
ATTORNEY

Jan. 17, 1961
R. T. BURNETT
2,968,367
COMBINATION SHOE AND DISK BRAKE
Filed June 17, 1955
3 Sheets-Sheet 3
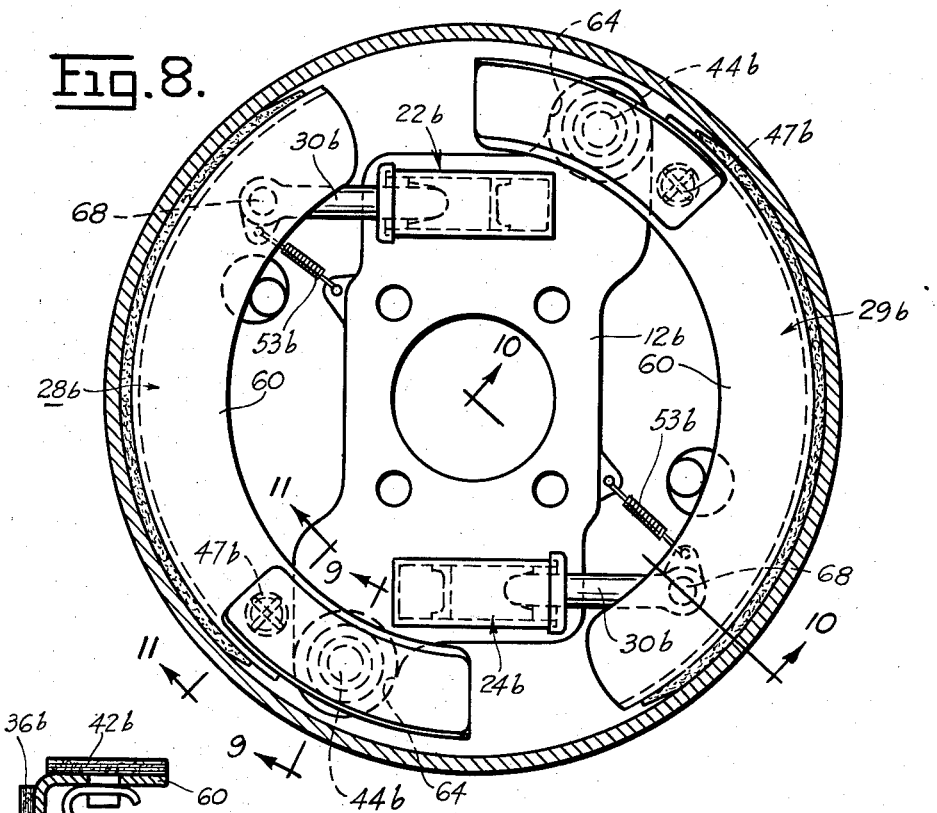
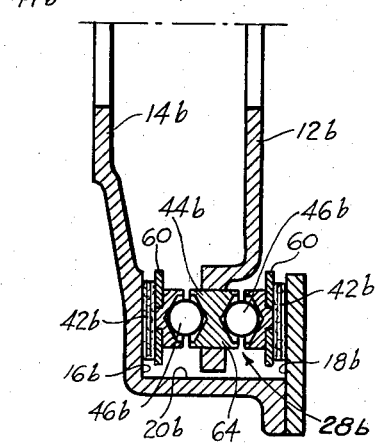
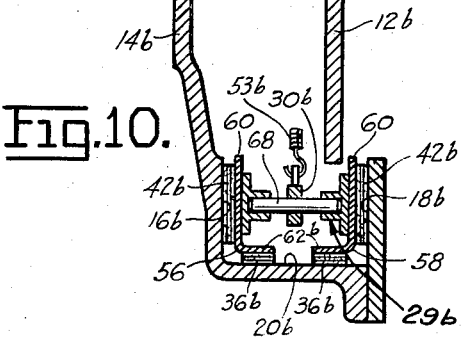
INVENTOR.
RICHARD T. BURNETT.
BY *John A. Young*
ATTORNEY United States Patent Office 2,968,367
Patented Jan. 17, 1961

2,968,367
COMBINATION SHOE AND DISK BRAKE

Richard T. Burnett, South Bend, Ind., assignor to The Bendix Corporation, a corporation of Delaware Filed June 17, 1955, Ser. No. 516,149

14 Claims. (Cl. 188—70)

This invention relates generally to brakes and more specifically to a composite brake unit having a plurality of distinct friction elements.

As a partial solution to braking problems caused by thermal effects, it has been proposed to dissipate the kinetic energy of a brake application over a wider surface of the rotatable member. Several examples of this principle can be found in my copending applications, among which are application No. 324,167, filed December 5, 1952 and now abandoned in favor of continuation application Serial No. 598,698, filed July 18, 1956; application No. 369,197, filed July 20, 1953, now Patent No. 2,871,990; and application No. 392,177, filed November 16, 1953, now Patent No. 2,897,921.

Distributing the braking torque by means of a number of distinct friction elements results in a cooler running brake thus eliminating or substantially reducing undesirable effects of overheating the brake.

It will be noted that in the brakes illustrated in the cited applications, one of the friction elements is directly applied by the operator and the other friction element is actuated as a reaction from application of the operator-controlled friction element. In the examples, the portion of the brake which is directly applied by the operator consists of "disk" friction elements. In the present invention, it is the arcuate "shoe" friction element which is directly applied by the operator and the reaction developed from application of this arcuate "shoe" element is used to apply the "disk" friction elements.

Among the various objects of the invention, it is my purpose to obtain: (1) a cooler running brake which can absorb a higher order of kinetic energies without becoming overheated, (2) a brake having increased effectiveness, that is, one in which the torque developed by the brake will be very greatly increased without increase in the operator's applying effort, and (3) a highly controllable brake in which the retarding effort developed by the brake mechanism will remain proportional to the operator's applying effort throughout the brake operation.

Figure 6:
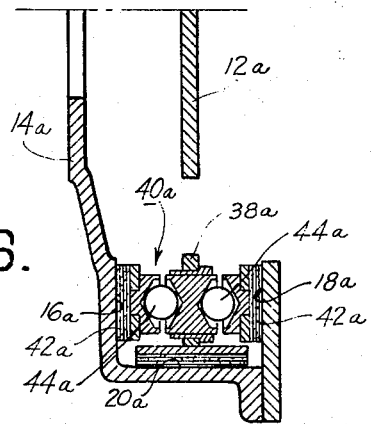
Figure 7:
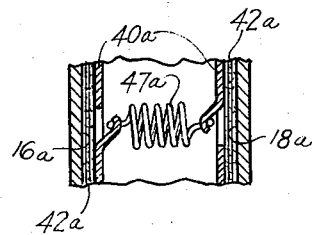

Other objects and features of the invention will become apparent from a consideration of the following description in which a plurality of embodiments are illustrated by way of example. The following description proceeds with reference to the accompanying drawings wherein:

Figure 1 is a side elevation of a brake assembly;

Figures 2, 3, and 4 are section views taken respectively on the corresponding lines 2—2, 3—3, and 4—4 of Figure 1;

Figure 5 illustrates a second embodiment of the invention shown in side elevation;

Figures 6 and 7 are section views taken on lines 6—6 and 7—7 of Figure 5; and

Figures 8, 9, 10, and 11 are illustrations of a yet further embodiment of the invention, Figure 8 being a side elevation view and Figures 9, 10, and 11 being section views taken on the corresponding lines in Figure 8.

Referring first to the embodiment shown in Figures 1 to 4, the brake includes a fixed torque plate 12 which is secured to a stationary part of the vehicle, usually an axle flange or an axle housing (not shown). A rotor 14 is fastened to a movable part of the vehicle, such as a wheel (not shown). The rotor 14 (Figure 2) has spaced apart disk surfaces 16 and 18 and a cylindrical drum surface 20; each of these surfaces are engaged during brake operation. The rotor construction is disclosed in greater detail in copending application No. 434,846, filed June 7, 1954.

A pair of fluid motors 22 and 24 are secured to the torque plate 12 on opposite sides thereof. Two oppositely acting pistons 26 are slidably received in each of the fluid motors and are operatively connected to brake units 28 and 29. This operative connection may consist of links 30 or the like (Figures 1 and 4).

Each of the brake units 28 and 29 is identically constructed; the following detailed description of the one applies equally to both. Friction unit 29 consists of an arcuate shoe brake element 32 having a rim 34 with friction material lining 36, and a transverse strengthening web 38. On opposite sides of the web 38 there are located disk friction elements 40 having friction material lining 42 thereon arranged for engagement with surfaces 16 and 18 of the rotor. Camming devices 44 are provided between web 38 and the disk friction elements. The camming devices 44 consist of ramps 46 which are formed as recesses in the disk friction elements 40 and in the opposite sides of the web 38, respectively. Balls 48 are carried in the recesses and roll on the ramps 46 when relative circumferential movement occurs between the shoe and disk elements to axially apply the disk elements against the sides 16 and 18 of the rotor.

It will be noted that links 30 connect the pistons 26 and adjacent ends of the shoe brake elements 32. The disk friction elements 40 extend slightly beyond the web 38 of the shoe brake element and engage the fluid motors 22 and 24 to anchor the unit. The ends 49 of the disk friction elements are curved at the point of engagement with the fluid motors to permit pivoting of the entire brake unit at either end about the fluid motor anchor. A spring 47 (Figure 3) is fastened between the disk elements to hold them in a normally retracted position.

Because the ends 49 of the disk friction elements extend beyond the web of the shoe elements, a slight circumferential shifting of the shoe brake element is permitted relatively to the disk brake elements. The adjacent ends 49 of the disk friction elements are held against the upper fluid motor anchor by a spring 51. The units are suspended vertically by means of springs 53 which are fastened between the torque plate and the lower ends of the units 28 and 29.

The operation of the embodiment shown in Figures 1 to 4 will next be described. When the operator applies the brake, fluid pressure is developed in motors 22 and 24 to force the pistons 26 apart. The piston movement actuates the shoe elements 32 through the links 30, thus engaging friction material lining 36 on rim 34 with surface 20 of the rotor. Assuming that the rotor is turning counterclockwise (Figure 1), the shoe element will tend to shift circumferentially with the rotor in a counterclockwise direction with respect to the disk friction elements 40. Relative circumferential movement between the shoe brake element 32 and disk friction elements 40 develops axially directed applying force on the disk friction elements.

The camming devices 44 exert oppositely directed thrust on the disk friction elements responsively to circumferential shifting of the shoe brake element 32 relative to the associated disk friction element 40. The entire brake unit pivots on the curved ends 49 of the disk friction element, at their point of engagement with the fluid motor. Thus, during braking with forward vehicle movement (rotor turning counterclockwise), the left hand unit 28 in Figure 1 pivots on and anchors against the lower fluid motor 24 and the right hand unit 29 pivots on and anchors against the upper fluid motor 22.

It will be seen from the operation of the device that the shoe brake element anchors on the disk friction elements through the camming devices, and the reaction developed from application of the shoe brake element supplies the necessary actuating force for application of the disk friction elements. The entire brake unit anchors on the ends of the disk friction elements at their point of engagement with the fluid motor. Initial brake application consists of applying the shoe friction element which in turn then produces application of the disk friction element through the camming devices. The shoe brake element is the part of the brake directly applied by the operator. The disk friction elements are only indirectly applied inasmuch as their actuation is effected by the reaction from the arcuate shoe braking.

During braking with opposite (clockwise) turning of the rotor, the shoe brake elements shift clockwise when they engage the rotor. The shoe brake elements shift circumferentially relative to the disk friction elements, thus bringing the disk friction elements into engagement with the spaced sides of the rotor. In this instance, the brake unit 28 pivots on and anchors against the upper fluid motor at the left hand side thereof, and brake unit 29 pivots on and anchors against the lower fluid motor at the right hand side thereof.

In the next embodiment, shown in Figures 5 to 7, parts of the brake assembly corresponding to those previously described, will be referred to by the same reference numeral with the subscript "a."

Rigidly secured to torque plate 12a is an anchor 50. Mounted on the torque plate 12a are a pair of shoe brake elements 32a. One or the other of the expansible ends 52 and 54 of the shoe brake elements 32a anchors on anchor member 50, depending upon the direction of rotation of rotor 14a during braking. Fluid motor 22a spreads apart the adjacent ends of the shoe brake elements 52 and 54 to apply the brake. As in the previous embodiment, the rotor 14a is equipped with spaced apart surfaces 16a and 18a joined by a cylindrical surface 20a. The ends of the shoes 32a opposite the anchoring ends thereof are fastened together by disk friction elements 40a having friction material lining 42a. Camming devices 44a are located at opposite ends of the disk friction elements and are fitted between the webs 38a of the shoe brake 32a and the disk friction element 40a. Each shoe brake element consists of a rim 34a having friction material lining 36a and a web 38a. The ends 52 and 54 of the shoe brake elements are held in engagement with anchor 50 by springs 51a to thereby release and suspend the shoe brake elements.

The camming devices 44a herein shown are constructed as ball-ramp combinations, the ramps 46a being formed as recesses associated with opposite sides of the web 38a. The webs 38a of the brake shoes can shift circumferentially between the disk elements. This relative circumferential movement between the webs 38a and the disks, introduce an axially directed applying force on the disks by means of the camming devices 44a. A fluid motor 22a is operatively connected to the ends 52 and 54 of the shoe friction elements 32a by means of links 30a. The fluid motor 22a is operator controlled and is utilized to initially apply the brake in a manner more fully explained later in this disclosure. The disk elements 40a are held in a normally released position by a spring 47a which is fastened between the disk elements (Figure 7).

To operate the brake illustrated in Figures 5 to 7, fluid pressure is developed in motor 22a spreading ends 52 and 54 of the shoe brake elements 32a. Assuming counterclockwise turning of the rotor (Figure 5), engagement of the arcuate shoe friction element 32a on the left hand side of the brake will cause it to move away from anchor 50 and turn with the rotor in a counterclockwise direction. This turning of the arcuate shoe element 32a results in relative circumferential movement between web 38a and disk friction elements 40a, whereupon camming devices 44a develop oppositely directed thrust on the disk friction elements 40a at the left hand ends thereof. The lining 42a is thus forcibly engaged with surfaces 16a and 18a of the rotor. It is the engagement of the left hand arcuate shoe friction element which develops force utilized as applying effort on the disk friction elements. The disk friction elements tend to move counterclockwise with the rotor. The right hand ends of the disk friction elements are spread by camming devices 44a and act on the lower end of the right hand shoe friction element 32a, bringing the friction material lined rim thereof into engagement with the surface 20a of the rotor. The entire friction unit anchors on end 54 of the right hand shoe brake element which bears against the anchor 50.

It will be noted that reaction of application of the left hand shoe friction element is transmitted through the disk elements as applying effort on the right hand shoe friction element. A further feature in operation of the brake is that the left hand shoe friction element anchors on the camming device but the reaction of both arcuate shoe brake elements is ultimately transmitted to the anchor 50.

A further embodiment of the invention is shown in Figures 8 to 11. Parts of the brake corresponding to those previously described will receive the same reference numeral with the subscript "b."

The brake is provided with a torque plate 12b which is fastened to a fixed part of the vehicle. The rotor 14b is of the same construction as shown in the prior embodiments.

The two friction units 28b and 29b are actuated by fluid motors 22b and 24b. Each of the brake units 28b and 29b is identically constructed; the following description of one of the units applies for both. Each of the friction units consists of separable portions 56 and 58 which are of L-shaped cross section, as shown in Figure 10. One leg 60 of the portion 56 has lining 42b engageable with surface 16b of the rotor and the other leg 62b has friction material lining 36b engageable with surface 20b of the rotor. The other portion 58 is constructed with a first leg 60 having lining 42b engageable with surface 18b of the rotor and a second leg 62b with friction material lining 36b engageable with surface 20b of the rotor. The two portions 56 and 58 are spread apart by a camming device 44b which also serves to pivot the brake unit as a whole. The two legs 60 are urged together by means of a spring 47b (Figure 11) so that the friction material lining 42b is retracted from the sides 16b and 18b of the rotor.

The camming device 44b consists of ball-and-ramp combinations 46b which are located on opposite sides of a cylindrical member 64 which is received in the torque plate 12b. Links 30b transmit applying force from the fluid motor to the brake unit. The applying link may include a post 68 which is transversely secured to legs 60 of the portions 56 and 58. This linkage permits the two portions 56 and 58 to be spread apart during brake application.

The brake shown in Figures 8 to 11 is applied by developing pressure in fluid motors 22b and 24b, thus causing the brake units to pivot about their respective camming devices. This pivoting of the brake units brings the friction material lining 36b on legs 62b into forcible engagement with surface 20b of the rotor. The two portions 56 and 58 then shift circumferentially with the rotor, moving relatively to the cylindrical member 64, whereupon camming devices 44b wedge the two portions 56 and 58 apart bringing lining 42b into forcible engagement with surfaces 16b and 18b of the rotor. When the brake is released, the springs 47b and 53b disengage the lining from the sides of the rotor.

In this embodiment, it will be seen that initial brake application consists of bringing the shoe friction elements into forcible engagement with the rotors; as the two portions then tend to shift circumferentially, the cams effect opposite application of the disk friction elements. The torque reaction from both disk and shoe friction elements, is transmitted to the torque plate 12b through the camming devices which serve as anchoring means pivots for the brake units, and applying means for the disk elements.

From a consideration of the construction and operation of these embodiments, it will be seen that retarding effort is exerted by a plurality of distinct friction elements. Also, the kinetic energy of braking is dissipated over a plurality of surfaces of a rotatable member. A further feature of the invention is that one friction element, the shoe brake element, is used to "servo" or apply the other friction elements, the disk friction element.

Although the invention has been described in connection with but a few embodiments, it will be apparent to those skilled in the art that changes in both construction and arrangement of parts are possible without departing from the underlying principles of the invention.

I intend, therefore, to include within the scope of the following claims all equivalent structures for accomplishing the same or equivalent objects of the invention.

I claim:

1. A kinetic-energy-absorbing device comprising a U-shaped cross section rotor having spaced apart disk surfaces joined by a cylindrical drum surface, a pair of brake units each inclusive of a first friction element having a lined rim engageable with the cylindrical drum surface of said rotor, a web formed transversely to said rim, oppositely-acting second friction elements located on either side of said web and engageable with the disk surfaces of said rotor, camming devices arranged to impart axially directed applying force on said second friction elements upon relative circumferential movement of said first and second friction elements, a fluid motor associated with each of said units for initially applying the first friction element thereof, means interconnecting said fluid motors and said first friction elements whereby actuation of said motors produce application of said first friction elements against the cylindrical surface of said rotor, and anchoring means associated with the ends of each of the second friction elements and which provide fixed abutments upon which said brake units are arranged to pivot.

2. A kinetic-energy-absorbing device comprising a pair of brake units each inclusive of oppositely-acting first friction elements and a radially-applied second friction element, anchoring means associated with each of said units and upon which said entire unit is arranged to pivot, a fluid motor associated with opposite ends of each of said units, means connecting the opposite ends of each of said second friction elements with said fluid motors, a U-shaped cross section rotor having spaced apart surfaces engageable with said first friction elements and a cylindrical surface engageable with said second friction element, camming devices associated with said friction elements and arranged to impart axially directed applying effort on said first friction elements as a result of relative circumferential movement between said first and second friction elements, said fluid motors being associated with said second friction elements to produce initial brake application by bringing said second friction elements into forcible engagement with the cylindrical surface of said rotor to produce circumferential shifting of said second friction elements relative to said first friction elements.

3. A kinetic-energy-absorbing device comprising a pair of brake units each inclusive of pivoted oppositely-acting first friction elements, and a radially applied second friction element circumferentially movable relatively to said first friction elements, camming devices arranged to exert axially directed applying force on said first friction elements responsively to relative circumferential movement between the second friction element and said first friction elements, anchoring means for said unit upon which said first friction elements are arranged to pivot, and means for actuating said device by initially applying said second friction element.

4. In a kinetic-energy-absorbing device, a torque taking member, oppositely located fluid motors fixedly secured to said torque taking member, two brake units arranged to pivotally engage at opposite ends thereof with said fluid motors, each brake unit being inclusive of oppositely-acting axially-movable first friction elements, a radially-applied second friction element having a portion thereof received between said first friction elements, said second friction element being circumferentially movable relatively to both said first friction elements, and camming devices arranged to impart oppositely-directed applying force on said first friction elements responsively to circumferential movement of said second friction element relatively to said first friction elements, and applying links operatively interconnecting said fluid motors and the opposite ends of said second friction element whereby initial application of said brake is effected by radially moving said second friction element.

5. In a brake, a U-shaped cross section rotor having a cylindrical brake surface and two laterally spaced apart annular braking surfaces rigidly joined to said cylindrical surface, a brake unit inclusive of an arcuate lined friction surface which is initially brought into engagement with the cylindrical surface of said rotor, two oppositely-acting friction elements which are spread apart in forcible engagement with the annular friction surfaces of the rotor, and cam means which are located between said oppositely-acting friction elements and are responsive to circumferential shiftable movement of the radially applied friction element to exert oppositely directed applying force on said oppositely-acting friction elements, and means for anchoring the unit as a whole whereby circumferential movement of the unit is limited.

6. The brake structure in accordance with claim 5 including a torque-taking member and wherein said arcuate lined friction surface is provided by a pair of brake shoes having adjacent expansible ends, said shoes including friction material lined rims and transverse strengthening webs, and a fluid motor for applying said brake, said fluid motor being operatively connected to the expansible ends of said shoes for radially urging said shoes into engagement with said rotor.

7. The brake structure in accordance with claim 5 wherein said arcuate lined friction surface is provided by a pair of brake shoes having adjacent expansible ends and a fixed member against which said shoe ends are arranged to alternatively anchor depending upon the direction of vehicle movement to be impeded.

8. The brake structure in accordance with claim 5 wherein said arcuate lined friction surface is provided by a pair of brake shoes anchoring alternatively at either adjacent expansible end, and wherein said two oppositely-acting friction elements interconnect said brake shoes and serve as a force transmitting means whereby reaction from application of one of the brake shoes is communicated as applying effort on the other brake shoe.

9. The brake structure in accordance with claim 5 wherein said radially applied first friction element comprises two arcuate shoes and said oppositely-acting second friction elements provide force transmitting therebetween and said camming devices interconnect each of said brake shoes with said second friction elements.

10. A kinetic-energy-absorbing device in accordance with claim 5 including a rotor having spaced apart disk surfaces and a cylindrical drum surface and a torque taking member and wherein a pair of brake units is provided each inclusive of L-shaped cross section members having friction material lining thereon, one portion of each of said members being engageable with one of the disk surfaces of said rotor, and both of said members having a portion engageable with the drum surface of said rotor, said brake units being arranged to pivot on their respective camming devices to produce frictional interengagement of said unit and the drum surface of said rotor.

11. The brake structure in accordance with claim 5 including a fixed member, and wherein said cam means comprises two spaced camming devices having stationary portions formed in said fixed member, and two brake units each including separable friction elements which are pivoted on a respective one of said cam means into engagement with the cylindrical surface and are forced apart by circumferential movement relative to said cam means whereby the disks of said rotor are frictionally engaged, and a fluid motor associated with each of said units whereby initial brake application is made by pivoting the units about said cam means to apply the friction elements against the cylindrical surface of said rotor.

12. A kinetic-energy-absorbing device comprising a U-shaped cross section rotor having spaced apart friction surfaces in opposed facing relation and a transverse cylindrical friction surface, a radially applied first friction element, means for initially applying said first friction element against the opposed cylindrical surface of said rotor, two oppositely-acting disk elements which are forced apart to be engageable with the axially spaced annular surfaces of said rotor, camming means disposed between said disk elements and connected with each of said disk elements and radially applied first friction element to translate circumferential movement of said radially applied friction element into oppositely exerted thrust on said disk elements whereby the disk elements are spread farther apart to be brought into engagement with the annular interior surfaces of said rotor, and anchoring means combined with said disk elements to limit circumferential movement of both the first friction element and disk elements.

13. In a kinetic-energy-absorbing device, a brake unit comprising a radially actuated first friction element which is initially applied in brake operation, anchoring means for said first friction element defining the center of pivotal movement of said first friction element, a camming device forming a part of said anchoring means and through which the anchoring load of said first friction element is transmitted in its communication to said anchoring means, oppositely-acting second friction elements of said units having a spacing therebetween proportioned to receive said camming device therebetween to effect a thrust connection with said second friction elements, said first friction element being circumferentially movable relative to said camming device to develop axially directed applying thrust on said second friction elements through said camming device.

14. In a kinetic-energy absorbing device, a brake unit comprising a radially actuated first friction element which is initially applied in brake operation, anchoring means for said first friction element defining the center of pivotal movement of said first friction element, a camming device forming a part of said anchoring means and through which said first friction element is anchored, and oppositely-acting second friction elements of said unit having a spacing therebetween proportioned to receive said camming device therebetween to effect a thrust connection with said second friction elements, said first friction element being circumferentially movable relative to said camming devices to develop axially directed applying thrust on said second friction elements which are also pivotally movable on said anchoring means, and a U-shaped cross section rotor in which said unit is mounted.

References Cited in the file of this patent

UNITED STATES PATENTS

| 2,057,422 | Dickson | Oct. 13, 1936 |
| 2,065,382 | Levy | Dec. 22, 1936 |
| 2,344,933 | Lambert | Mar. 21, 1944 |
| 2,827,985 | Butler | Mar. 25, 1958 |

FOREIGN PATENTS

| 707,074 | Germany | June 12, 1941 |
| 543,905 | Great Britain | Mar. 18, 1942 |
| 457,483 | Italy | May 20, 1950 |